United States Patent
Gorokhov et al.

(10) Patent No.: US 8,254,946 B2
(45) Date of Patent: Aug. 28, 2012

(54) METHODS AND APPARATUS FOR FLEXIBLE SPECTRUM ALLOCATION IN COMMUNICATION SYSTEMS

(75) Inventors: Alexei Y. Gorokhov, San Diego, CA (US); Avneesh Agrawal, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 33 days.

(21) Appl. No.: 12/719,794

(22) Filed: Mar. 8, 2010

(65) Prior Publication Data

US 2010/0159940 A1  Jun. 24, 2010

Related U.S. Application Data

(62) Division of application No. 11/022,514, filed on Dec. 22, 2004, now Pat. No. 7,706,350.

(60) Provisional application No. 60/554,899, filed on Mar. 19, 2004.

(51) Int. Cl.
*H04W 72/04* (2009.01)

(52) U.S. Cl. .... 455/450; 455/63.1; 455/446; 455/452.1; 370/334; 370/208

(58) Field of Classification Search .................. 455/446, 455/447, 450
See application file for complete search history.

(56) References Cited

U.S. PATENT DOCUMENTS

| | | |
|---|---|---|
| 5,544,198 A | 8/1996 | Saalfrank |
| 6,047,186 A | 4/2000 | Yu et al. |
| 7,010,304 B1 | 3/2006 | Zhang et al. |
| 7,706,350 B2 | 4/2010 | Gorokhov et al. |
| 2002/0163879 A1 | 11/2002 | Li et al. |
| 2003/0169681 A1* | 9/2003 | Li et al. .......................... 370/203 |
| 2005/0180313 A1 | 8/2005 | Kim et al. |
| 2005/0191964 A1 | 9/2005 | Hundal |

FOREIGN PATENT DOCUMENTS

| | | |
|---|---|---|
| DE | 19800953 C1 | 7/1999 |
| RU | 2099886 | 12/1997 |
| WO | WO9816029 A2 | 4/1998 |
| WO | WO0249306 | 6/2002 |
| WO | WO2004004269 | 1/2004 |

OTHER PUBLICATIONS

International Search Report—PCT/US05/007046, International Search Authority—European Search Authority—Jul. 8, 2005.
Written Opinion—PCT/US05/007046, International Search Authority—European Search Authority—Jul. 8, 2005.
Taiwan Search Report—TW094106804—TIPO—Jun. 24, 2011.

* cited by examiner

*Primary Examiner* — David Q Nguyen
(74) *Attorney, Agent, or Firm* — William M. Hooks

(57) ABSTRACT

The disclosed embodiments provide for methods and systems for flexibly allocating a shared frequency spectrum to a plurality of users, the spectrum may have a first number of segments, each segment having a second number of clusters associated with a certain sector/cell. In one aspect, a method for flexibly allocating a shared frequency spectrum to a plurality of users comprises the acts of fixedly assigning a first group of clusters to a first group of users, such that the first group of users stay fixed to the assigned clusters, and assigning a second group of clusters to a second group of users, such that the second group of users hop within the assigned clusters.

20 Claims, 3 Drawing Sheets

METHODS AND APPARATUS FOR FLEXIBLE SPECTRUM ALLOCATION IN COMMUNICATION SYSTEMS

RELATED APPLICATIONS

Claim of Priority Under 35 U.S.C. §120

The present Application for Patent is a Divisional of patent application Ser. No. 11/022,514 entitled "METHODS AND APPARATUS FOR FLEXIBLE SPECTRUM ALLOCATION IN COMMUNICATION SYSTEMS" filed Dec. 22, 2004 pending, which claims priority to Provisional Application No. 60/554,899 entitled "FLEXIBLE SPECTRUM ALLOCATION IN OFDMA" filed Mar. 19, 2004, both of which are assigned to the assignee hereof and hereby expressly incorporated by reference herein.

BACKGROUND

I. Field

The present invention relates generally to communications and more specifically to techniques for flexible spectrum allocation to a plurality of users in a communication system.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

A communication system may employ bandwidth allocation to avoid interference and improve link reliability. There is therefore a need in the art for techniques for flexible bandwidth allocation that improves interference.

SUMMARY

The disclosed embodiments provide for methods and systems for flexibly allocating a shared frequency spectrum to a plurality of users. The spectrum may have a first number of segments, each segment having a second number of clusters associated with a certain sector/cell. In one aspect, a method for flexibly allocating a shared frequency spectrum to a plurality of users comprises the acts of fixedly assigning a first group of clusters to a first group of users, such that the first group of users stay fixed to the assigned clusters, and assigning a second group of clusters to a second group of users, such that the second group of users hop within the assigned clusters, is described.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein is "exemplary" and is not necessarily to be construed as preferred or advantageous over other embodiments or designs.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may comprise an IP network, by converting received air-interface frames to IP packets. Access point also coordinates the management of attributes for the air interface.

Figure 1:
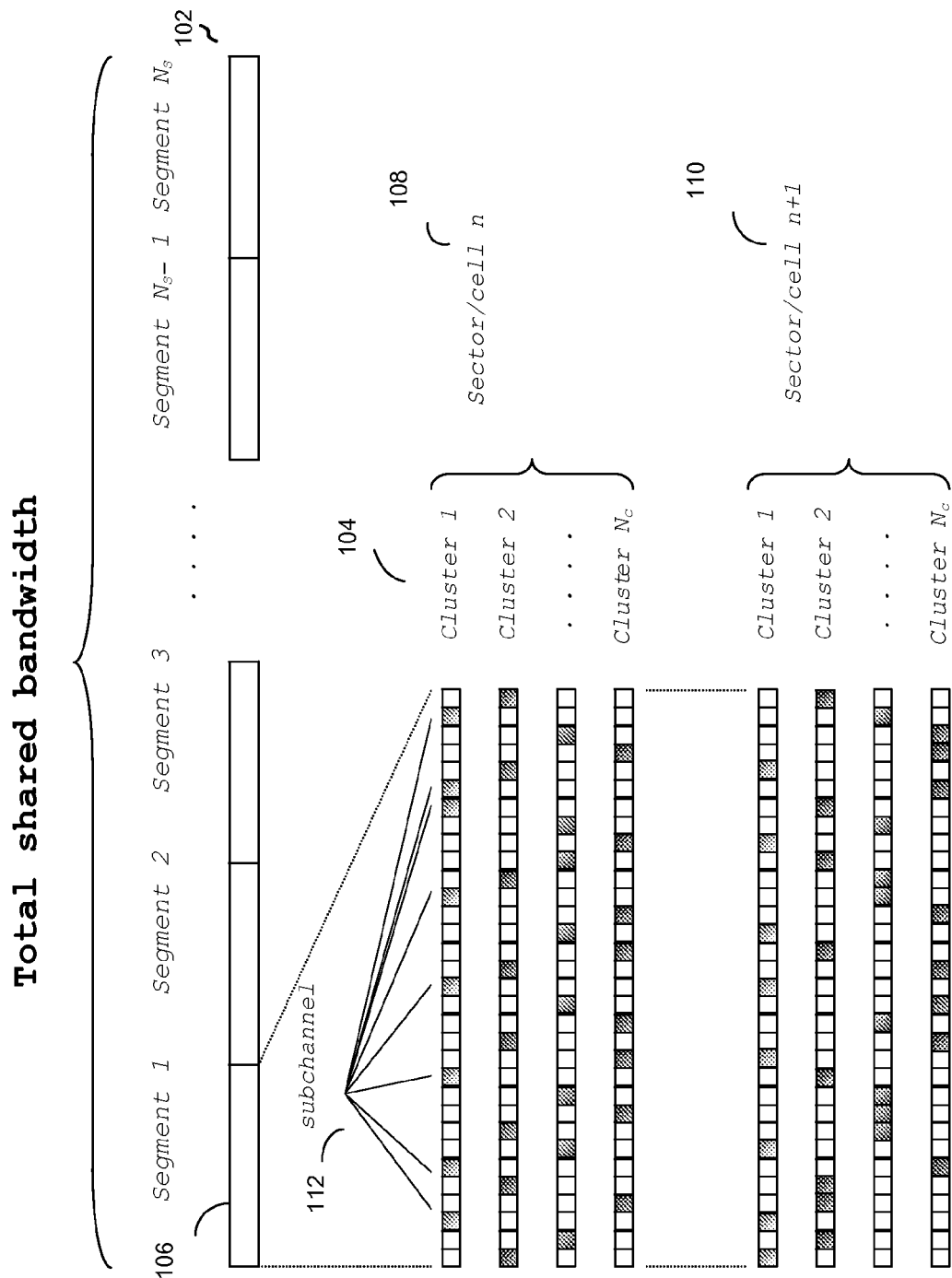
FIG. 1 shows one embodiment for frequency spectrum partitioning.

FIG. 1 shows one embodiment for frequency spectrum partitioning. The forward link (FL) and/or the reverse link (RL) channel frequency spectrum, e.g., in an OFDMA system, may comprise of N orthogonal sub-carriers or tones. In one embodiment as shown in FIG. 1, one may partition the set of N tones into $N_s$ segments 102, each segment having a size of $M_s$ frequency tones. In one embodiment, the segments are contiguous in frequency spectrum, while other arrangements are also possible.

In one embodiment, each segment is subdivided into a set of $N_c$ clusters 104, each of size $M_c$ tones, associated with each sector/cell 108, 110. In one embodiment, the clusters associated with a sector/cell have non-overlapping sub-carrier assignments. In the example given in FIG. 1, the segment size is $M_s$=32 tones and at least one segment, e.g., the first segment 106, is partitioned to $N_c$=4 clusters of size $M_c$=8 tones for each sector/cell 108, 110, although it is contemplated that any number of tones and/or clusters may be used. The clusters 104 shown in FIG. 1 have non-contiguous, non-overlapping sub-carrier assignment patterns for each sector/cell 108, 110, and the adjacent sectors/cells in the network have different cluster patterns. According to one embodiment, each of the clusters associated with a sector/cell, e.g., sector 108, is different with respect to each of the clusters associated with another sector/cell, e.g., sector 110.

In one embodiment, the same cluster pattern set is used for some or all segments in a given sector/cell, and such cluster pattern may be used as a characteristic of the sector/cell. The cluster pattern set may be defined by an ID, including segment ID and/or cluster ID, which may be communicated to the access terminal (AT) in the acquisition phase, or alternatively linked to the acquisition signature of the sector/cell. An appropriate design of cluster pattern set improves user interference diversity, as discussed below.

In one embodiment, a given cluster (sub-channel) in a given segment may be allocated to a user, as shown in FIG. 1. Alternatively, more than one cluster in a given segment or more than one cluster in more than one segment may be allocated to a user. In the example of FIG. 1, the allocation granularity is $M_c=8$ tones, although it is contemplated that the allocation granularity may be any number of tones. A user may be assigned multiple clusters in a single or multiple assignments. More details on the assignment strategy are given below.

In one embodiment, every user may be provided with a control channel or an item sent in the control channel, e.g., channel quality indicator (CQI), for every segment. The CQIs may be computed from the channel characteristics acquired for some or all tones. The resulting CQI per segment may be obtained, for example, by averaging the quality measures, such as SNR, Shannon capacity, etc., of some or all the tones from that segment.

In one embodiment, following a certain channel sensitive scheduling (CSS) criterion, the "best" match between a given segment and a user is identified. In one embodiment, channel information on the RL and/or FL may be used to schedule users to one or more segments of a shared frequency spectrum. A scheduler may assign the user one or more clusters, provided that at least one cluster is vacant. Such an assignment may be based on, and may be expected to secure, a good channel quality, e.g., measured in terms of channel gain. Upon the assignment, the user may be exposed to various interfering users operating in the adjacent sectors/cells. The disparity of cluster pattern sets corresponding to different sectors/cells, as discussed above in connection with FIG. 1, ensures that no user or a small number of users is exposed to a single interfering source, thereby ensuring interference diversity.

In the example shown in FIG. 1, any cluster associated with a given sector/cell 108 overlaps with each one of clusters associated with an adjacent sector/cell 110 in an equal amount of bandwidth or number of tones. For the current example, such clusters overlap in two tones, but differ in six. Thus, the disclosed partitioning, e.g., $N_c=4$ clusters and one user per cluster, as shown in FIG. 1, improves interference diversity. In a similar way, cluster pattern sets for the other adjacent sectors/cells may be designed to ensure full interference diversity. Full interference diversity condition described above assumes that no user is assigned two or more clusters within the same segment. In general, a user may be assigned two or more clusters within the same segment, e.g., when a single user is assigned a substantial fraction of the entire shared bandwidth, as discussed later.

The aforementioned example provides an example as how to ensure channel-sensitive scheduling (CSS) with interference diversity. Following this principle, one can achieve a desired tradeoff between the channel assignment granularity, interference diversity, and CSS efficiency by choosing the appropriate values for $N_s$, $M_c$, and $N_c$. The disclosed bandwidth allocation strategy may not introduce any overhead in assignment bandwidth, as compared to other bandwidth allocation techniques.

In one embodiment, the total number of bits that may be used for a bandwidth allocation is $\lceil \log_2(N_s) \rceil + \lceil \log_2(N_c) \rceil$. In one embodiment, bandwidth partitioning is "compact" in the sense that no tones are wasted, so that $$N_s \cdot N_c \cdot M_c = N.$$

In this case, one obtains $\lceil \log_2(N_s) \rceil + \lceil \log_2(N_c) \rceil \leq \lceil \log_2(N/M_c) \rceil + 1$, while $\lceil \log_2(N/M_c) \rceil$ is the minimum number of bits required to allocate a cluster comprising $M_c$ tones in a system with N tones, assuming non-overlapping tones.

In one embodiment, channel quality information on the RL and/or FL may be used to schedule users on a shared frequency spectrum, e.g., according to CSS scheduling approach discussed above. In the case of nonmoving or slow-moving user terminals, when the channel quality would not change, or changes very slowly, e.g., a pedestrian user, CSS approach may be used. In one embodiment, at least one of a first group of clusters of frequency sub-carriers is fixedly assigned to each of a first group of such users. In such a static or fixed assignment, where each of the first group of users is non-moving or slow moving, each of the first group of users is fixedly assigned to at least one of the first group of clusters until the user is reassigned, e.g., due to a change in the channel quality, speed, Doppler, or an indication, e.g., NACKs, that some packets are not being received.

In one embodiment, the shared frequency spectrum may be allocated to a second group of users that may have varying degree of mobility and/or channel quality, or when frequent NACKs are being received. In one embodiment, e.g., in the case of fast moving user terminals and/or users experiencing Doppler effect, e.g. a vehicular user, frequency Hopping (FH) approach may be used to compensate for fast variations in the channel quality and/or speed. In one embodiment, the second group of users may be (dynamically) assigned to a second group of clusters, such that the users hop within the assigned group of clusters.

In one embodiment, a user from the first group of users, operating under CSS scheduling mode, may be reassigned to the second group of users, operating under FH mode, when at least one characteristic of such user, e.g., channel quality, mobility, Doppler effect, rate of issued NACKs, etc., is changed. In one embodiment, a group of clusters assigned for CSS may be reassigned for FH, or vice versa.

Figure 2:
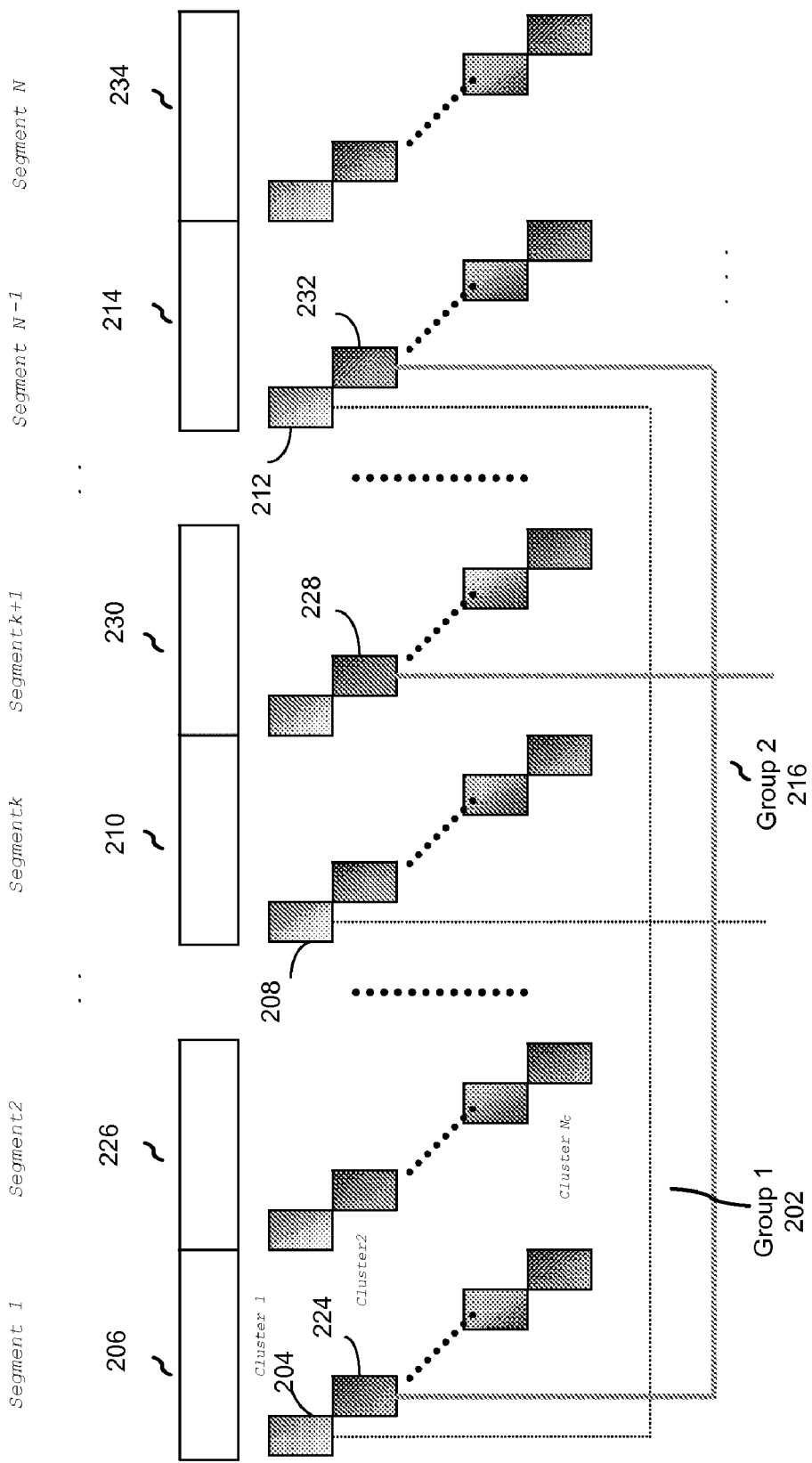
FIG. 2 shows one embodiment for flexible frequency spectrum allocation.

FIG. 2 shows one embodiment for implementing flexible frequency spectrum allocation to a plurality of diverse users. The grouping or association of clusters enables a flexible bandwidth partitioning and/or allocation between the CSS-scheduled users and the FH-scheduled users. The clusters from the same and/or different segments may be grouped into groups of certain size $N_g$. The group structure may be known to the access points, some or all access terminals, or both. The grouping structure may be fixed and each group may be specified by a group ID. Similar to the cluster pattern set, as discussed above, grouping structure may be different for different sectors/cells. A disparity of group structures for different sectors/cell may allow improved interference diversity.

In one embodiment, a channel assignment message may contain, besides the clusters ID and/or segment ID, a FH/CSS indicator or flag, e.g., a one-bit indicator, identifying a user, a group or users, and/or a group of clusters for FH/CSS scheduling. In the case of CSS assignment, a user stays with the assigned cluster group(s) until a new assignment. In the case of FH assignment, a user hops within the assigned cluster groups, according to a pre-defined hopping pattern, e.g., in the round robin fashion. In one embodiment, all the clusters within the same group are assigned either for CSS or for FH scheduling.

For the example shown in FIG. 2, the first group 202 may comprise the first cluster 204 of the first segment 206, the first cluster 208 of the $K^{th}$ segment 210, and first cluster 212 of the $(Ns-1)^{th}$ segment 214. The second group 216 comprises the second cluster 224 of the first segment 206, the second cluster 228 of the $(K+1)^{th}$ segment 230, and the second cluster 232 of the $(Ns-1)^{th}$ segment 214. As stated above, other group arrangements of the clusters may be used, e.g., different clusters from different segments may be grouped together.

According to one embodiment, the first group 202 may be designated as a CSS-scheduled group, meaning that the users assigned to first group 202 are fixedly assigned to the clusters in first group 202. This may be due to the fact that such users are nonmoving or slow moving, whose channel quality may not noticeably change with time. According to one embodiment, the second group 216 may be designated as a FH-scheduled group, meaning that the users assigned to second group 216 are (dynamically) assigned to the clusters in second group 216, such that the users my hop within the assigned group of clusters. This may be due to the fact that such users are fast moving, whose channel quality may rapidly change with time.

According to one embodiment, a group of users is assigned to the first group of clusters 202. The assignment may be based on the user's channels quality, as discussed above, e.g., user 1 may have high channel quality in the first segment 206, user 2 may have high channel quality in the $K^{th}$ segment 210, and user 3 may have high channel quality in the $(Ns-1)^{th}$ segment 214. If users 1, 2, and 3 are all scheduled for CSS, e.g., for being nonmoving or slow moving users, users 1, 2, and 3 may be fixedly assigned to clusters 204, 208, and 212, respectively, in first group 202.

According to one embodiment, users 4, 5, and 6 are assigned to the second group of clusters 216. However, if such users are fast moving users having rapidly changing channel quality and/or speed, and accordingly scheduled for FH, they may be dynamically assigned to clusters 224, 228, and 232, respectively, in the second group 216. Such users may hop from cluster to cluster within second group 216 according to a predetermined, or real-time configured, hopping scheme.

In one embodiment, when mobility, Doppler, or some other characteristics of a user changes, the user may be reassigned to a different group, or a regrouping of the clusters may happen. In the above example, if users 2 and 3 become fast moving, while users 4 and 5 become nonmoving or slow moving, users 1, 4, and 5 may be fixedly assigned to clusters 204, 208, and 212, respectively, in the first group 202, and users 2, 3, and 6 may be (dynamically) assigned to hop among the clusters 224, 228, and 232, respectively, in the second group 216. H is contemplated that different number of groups and/or clusters may be used.

According to one cluster assignment, spectrum partitioning between CSS and FH users yields the granularity of $N_g$ clusters. Hence, the choice of $N_g$ is a tradeoff between the minimum diversity order ($N_g$), on one hand, and the spectrum partitioning granularity of $N_g$ clusters (Ng×Mc tones), on the other hand. In one embodiment, a fairly small $N_g$ ensures a satisfactory channel diversity and granularity of partitioning. For example, small group size allows low channel diversity because of small number of clusters to hop. However, large group size, which improves channel diversity, increases granularity, i.e., each time a new user demands a new group of cluster, a large number of tones (Ng×Mc) need to be added, which may cause inefficient channel bandwidth use.

According to one embodiment, a number of clusters within a number of cluster groups may be assigned to a user. To assign M clusters to a single user by a single assignment message, M (consecutive) groups may be used, while the precise cluster within each group may be identified by an ID specified in the assignment message. In this case, the clusters corresponding to the (consecutive) groups may be interleaved in frequency to ensure frequency diversity within each channel.

For the exemplary grouping shown in FIG. 2, a user may be assigned to the first cluster 204 of the first group 202 and the first cluster of the second group 216, i.e., M=2. If the user is scheduled for CSS, the user may see diversity order of 2, i.e., the user is fixedly assigned to M=2 clusters 204, 224. However, if the user is scheduled for FH, the user may see diversity order of 6, i.e., the user may hop among M=2 groups of Ng=3 clusters each. For this choice of M=2 and Ng=3, FH provides an acceptable interference diversity.

Now, consider the case that the user is assigned to the first cluster of M=4 groups of clusters. If the user is scheduled to CSS, the user may see diversity order of M=4, and if the user is scheduled to FH, the user may see diversity of order of 12. Therefore, for the choice of M=4 and Ng=3, either CSS or FH may provide a satisfactory interference diversity. In one embodiment, a fast-moving user may be scheduled for FH mode when M<Ng, and for either CSS or FH mode when M≧Ng.

Figure 3:
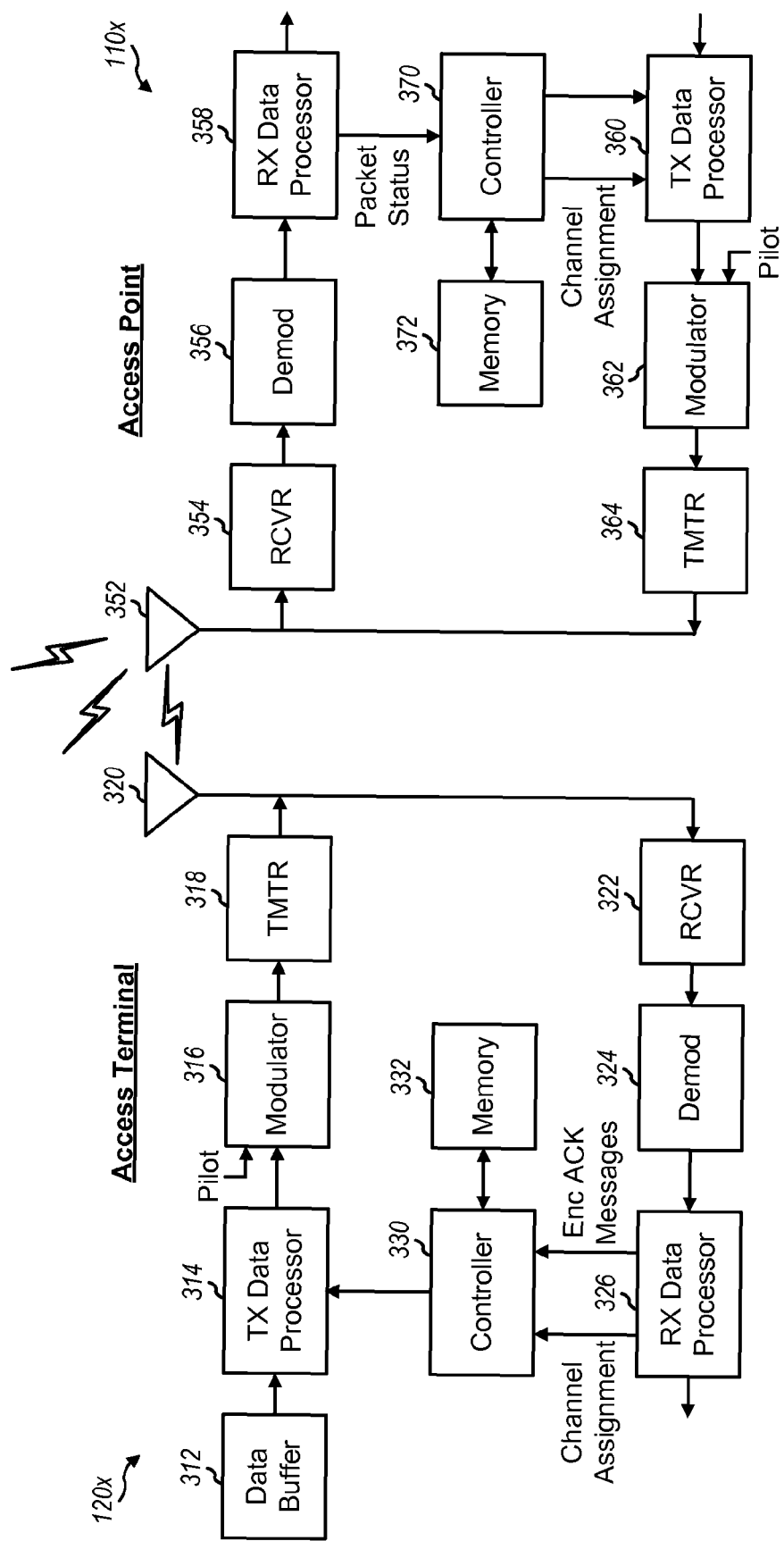
FIG. 3 shows a block diagram of an access point and an access terminal.

FIG. 3 shows a block diagram of a access point 110x and an access terminal 120x, for implementing flexible spectrum partitioning and allocation as discussed above in connection with FIG. 1 and FIG. 2. For the reverse link, at terminal 120x, a transmit (TX) data processor 314 receives traffic data from a data buffer 312, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 316 receives the data symbols, pilot symbols, and possibly signaling for the reverse link, performs OFDM modulation and/or other processing as specified by the system, and provides a stream of output chips. A transmitter unit (TMTR) 318 processes (e.g., converts to analog, filters, amplifies, and frequency up converts) the output chip stream and generates a modulated signal, which is transmitted from an antenna 320.

At access point 110x, the modulated signals transmitted by terminal 120x and other terminals in communication with access point 110x are received by an antenna 352. A receiver unit (RCVR) 354 processes (e.g., conditions and digitizes) the received signal from antenna 352 and provides received samples. A demodulator (Demod) 356 processes (e.g., demodulates and detects) the received samples and provides detected data symbols, which are noisy estimate of the data symbols transmitted by the terminals to access point 110x. A receive (RX) data processor 358 processes (e.g., symbol demaps, deinterleaves, and decodes) the detected data symbols for each terminal and provides decoded data for that terminal.

For the forward link, at access point 110x, traffic data is processed by a TX data processor 360 to generate data symbols. A modulator 362 receives the data symbols, pilot symbols, and signaling for the forward link, performs OFDM modulation and/or other pertinent processing, and provides an output chip stream, which is further conditioned by a transmitter unit 364 and transmitted from antenna 352. The forward link signaling may comprise power control commands generated by a controller 370 for all terminals transmitting on the reverse link to base station 110x. At terminal 120x, the modulated signal transmitted by base station 110x is received by antenna 320, conditioned and digitized by a receiver unit 322, and processed by a demodulator 324 to obtain detected data symbols. An RX data processor 326 processes the detected data symbols and provides decoded data for the terminal and the forward link signaling. Controller 330 receives the power control commands, and controls data transmission and transmits power on the reverse link to access point 110x. Controllers 330 and 370 direct the operation of terminal 120x and access point 110x, respectively. Memory units 332 and 372 store program codes and data used by controllers 330 and 370, respectively, to implement the flexible spectrum partitioning and/or allocation as discussed above.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 332 or 372 in FIG. 3) and executed by a processor (e.g., controller 330 or 370). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for a computing device to allocate frequency spectrum to a plurality of access terminals in a mobile communication system, the spectrum having a first number of segments, each segment having a second number of clusters of sub-carriers, the method comprising:
   assigning, by the computing device, at least one cluster from a first set of clusters to each of a first plurality of access terminals in a first sector/cell; and
   assigning, by the computing device, at least one cluster from a second set of clusters to each of a second plurality of access terminals in a second sector/cell, such that the at least one cluster assigned to the first plurality of access terminals in the first sector/cell has a frequency sub-carrier assignment pattern that includes at least one overlapping sub-carrier and at least one non-overlapping subcarrier with respect to the at least one cluster assigned to the second plurality of access terminals in the second sector/cell.

2. The method of claim 1, wherein at least some of the clusters have noncontiguous sub-carrier assignment pattern.

3. The method of claim 1, further comprising allocating sub-carriers within each segment of the frequency spectrum using a same cluster pattern.

4. The method of claim 1, further comprising providing an item in a control channel to each user for every segment of the spectrum.

5. The method of claim 1, wherein the assigning clusters from the first set of clusters is based on a channel quality of each of the first plurality of access terminals.

6. A non-volatile computer-readable medium embodying means for implementing a method for allocating frequency spectrum to a plurality of users, the spectrum having a first number of segments, each segment having a second number of clusters of sub-carriers, the method comprising:
   assigning at least one cluster from a first set of clusters to each of a first plurality of users in a first sector/cell; and
   assigning at least one cluster from a second set of clusters to each of a second plurality of users in a second sector/cell, such that each of the clusters assigned to the first plurality of users in the first sector/cell has a different frequency sub-carrier assignment pattern with respect to each of the clusters assigned to the second plurality of users in the second sector/cell, wherein the frequency sub-carrier assignment pattern indicates which subcarriers of a given segment correspond to a given cluster of the given segment such that a same frequency sub-carrier assignment pattern can be used for each of the first number of segments of the spectrum.

7. The medium of claim 6, wherein at least some of the clusters have noncontiguous sub-carrier assignment pattern.

8. The medium of claim 3, wherein the method further comprises allocating subcarriers within each segment of the frequency spectrum using a same cluster pattern.

9. The medium of claim 6, wherein the method further comprises providing an item in a control channel to each user for every segment of the spectrum.

10. The medium of claim 6, wherein the assigning clusters from the first set of clusters is based on a channel quality of each of the first plurality of users.

11. An apparatus for allocating frequency spectrum to a plurality of access terminals, the spectrum having a first number of segments, each segment having a second number of clusters of sub-carriers, comprising:
    means for assigning at least one cluster from a first set of clusters to each of a first plurality of access terminals in a first sector/cell; and
    means for assigning at least one cluster from a second set of clusters to each of a second plurality of access terminals in a second sector/cell, such that the at least one cluster assigned to the first plurality of access terminals in the first sector/cell has a frequency sub-carrier assignment pattern that includes at least one overlapping sub-carrier and at least one non-overlapping subcarrier with respect to the at least one cluster assigned to the second plurality of access terminals in the second sector/cell.

12. The apparatus of claim 11, wherein at least some of the clusters have noncontiguous sub-carrier assignment pattern.

13. The apparatus of claim 11, further comprising means for allocating subcarriers within each segment of the frequency spectrum using a same cluster pattern.

14. The apparatus of claim 11, further comprising means for providing an item in a control channel to each user for every segment of the spectrum.

15. The apparatus of claim 11, wherein the means for assigning clusters from the first set of clusters uses a channel quality of each of the first plurality of access terminals.

16. At least one processor programmed to execute a method for allocating frequency spectrum to a plurality of access terminals, the spectrum having a first number of segments, each segment having a second number of clusters of sub-carriers, the method comprising:
assigning at least one cluster from a first set of clusters to each of a first plurality of access terminals in a first sector/cell; and
assigning at least one cluster from a second set of clusters to each of a second plurality of access terminals in a second sector/cell, such that the at least one cluster assigned to the first plurality of access terminals in the first sector/cell has a frequency sub-carrier assignment pattern that includes at least one overlapping sub-carrier and at least one non-overlapping subcarrier with respect to the at least one cluster assigned to the second plurality of access terminals the second sector/cell.

17. The processor of claim 16, wherein at least some of the clusters have noncontiguous sub-carrier assignment pattern.

18. The processor of claim 16, wherein the method further comprises allocating subcarriers within each segment of the frequency spectrum using a same cluster pattern.

19. The processor of claim 16, wherein the method further comprises providing an item in a control channel to each user for every segment of the spectrum.

20. The processor of claim 16, wherein the assigning clusters from the first set of clusters is based on a channel quality of each of the first plurality of access terminals.

* * * * *